(12) United States Patent  (10) Patent No.: US 7,139,851 B2
Fujibayashi  (45) Date of Patent: Nov. 21, 2006

(54) METHOD AND APPARATUS FOR RE-SYNCHRONIZING MIRRORING PAIR WITH DATA CONSISTENCY

(75) Inventor: Akira Fujibayashi, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 315 days.

(21) Appl. No.: 10/785,002

(22) Filed: Feb. 25, 2004

(65) Prior Publication Data

US 2005/0223267 A1    Oct. 6, 2005

(51) Int. Cl.
*G06F 3/00* (2006.01)
(52) U.S. Cl. .................. 710/58; 707/200; 707/201; 707/202; 707/204; 707/205; 711/154; 711/161; 711/162; 714/5; 714/6; 714/7; 714/710; 714/718
(58) Field of Classification Search ................ None
See application file for complete search history.

(56) References Cited

U.S. PATENT DOCUMENTS

| 5,555,371 | A | 9/1996 | Duyanovich et al. |
| 5,592,618 | A | 1/1997 | Micka et al. |
| 5,734,818 | A | 3/1998 | Kern et al. |
| 5,889,935 | A | 3/1999 | Ofek et al. |
| 6,308,284 | B1 | 10/2001 | LeCrone et al. |
| 6,463,501 | B1 | 10/2002 | Kern et al. |
| 6,526,419 | B1 | 2/2003 | Burton et al. |
| 6,578,120 | B1 | 6/2003 | Crockett et al. |
| 2002/0049925 | A1* | 4/2002 | Galipeau et al. ............... 714/6 |
| 2002/0083281 | A1* | 6/2002 | Carteau ..................... 711/161 |
| 2003/0135650 | A1 | 7/2003 | Kano et al. |
| 2004/0073831 | A1* | 4/2004 | Yanai et al. .................... 714/7 |
| 2004/0080558 | A1* | 4/2004 | Blumenau et al. ............ 347/19 |
| 2006/0005074 | A1* | 1/2006 | Yanai et al. .................... 714/5 |

* cited by examiner

*Primary Examiner*—Fritz Fleming
*Assistant Examiner*—Niketa Patel
(74) *Attorney, Agent, or Firm*—Mattingly, Stanger, Malur & Brundidge, P.C.

(57) ABSTRACT

A method and apparatus for re-synchronizing a remote mirroring pair including first and second storage systems which are connected to each other via a path, the first storage system being connected to a host. A primary volume is provided to the first storage system and a remote secondary volume is provided to the second storage system. The remote secondary volume is a copied volume of the primary volume which is in synchronous mode with the remote secondary volume. A local secondary volume is provided in the first storage system and has stored therein journal logs of write I/O's from the host and old data including write data of previous write I/O's. Recovery of data on the primary volume based on the local secondary volume is conducted when necessary by applying the journal logs to the old data without suspending the synchronous mode between the primary and remote secondary volumes.

27 Claims, 19 Drawing Sheets

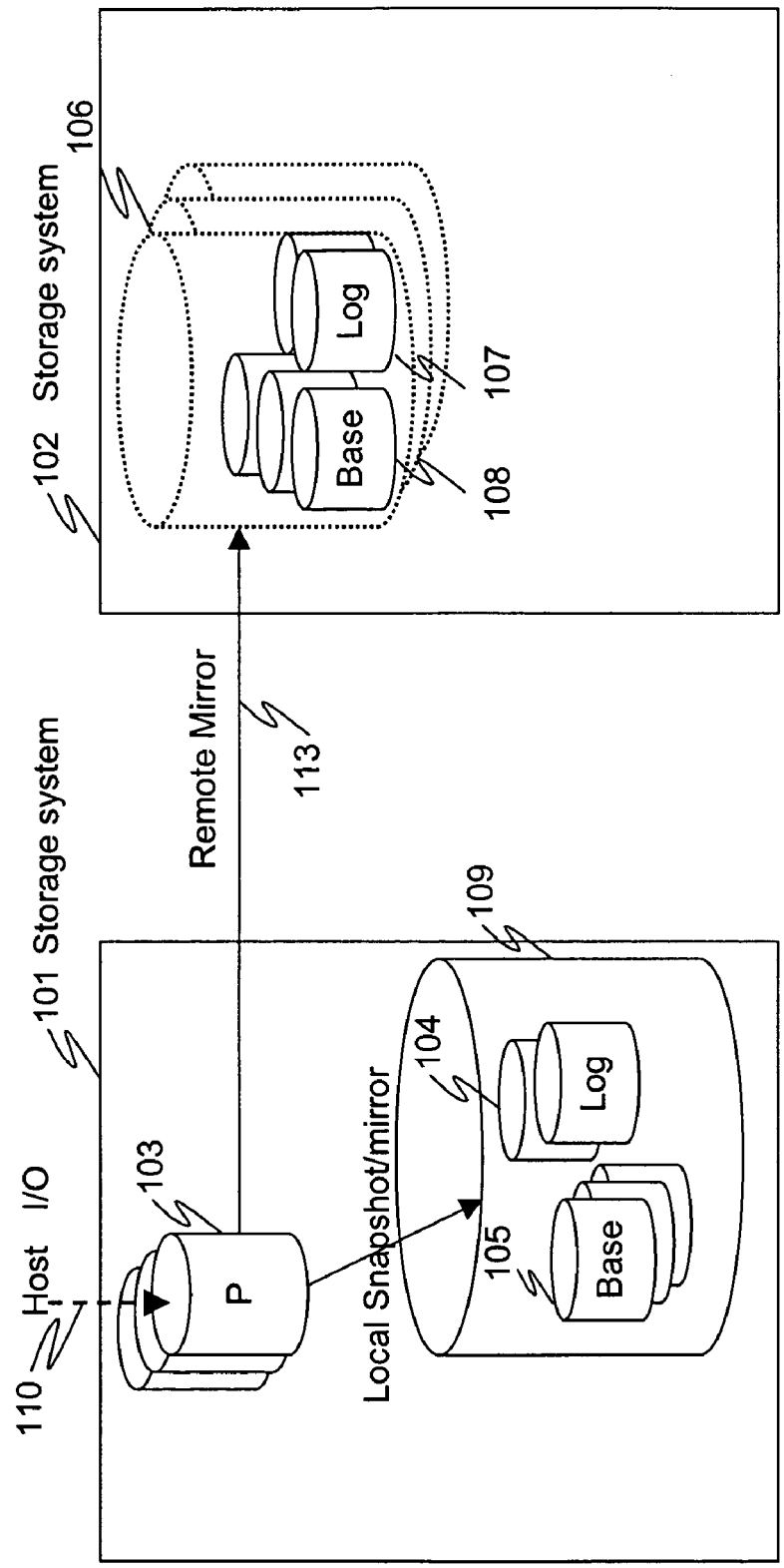

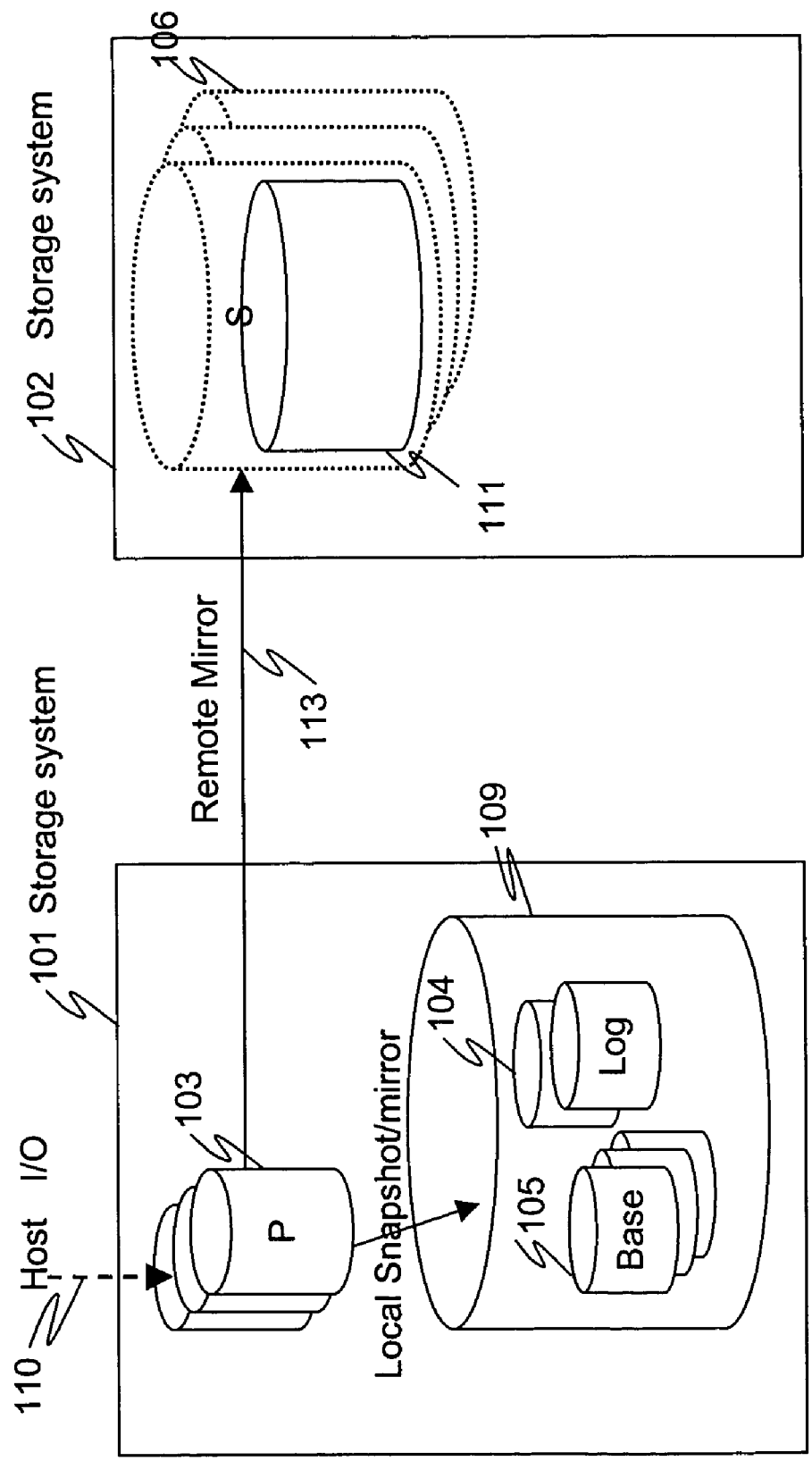

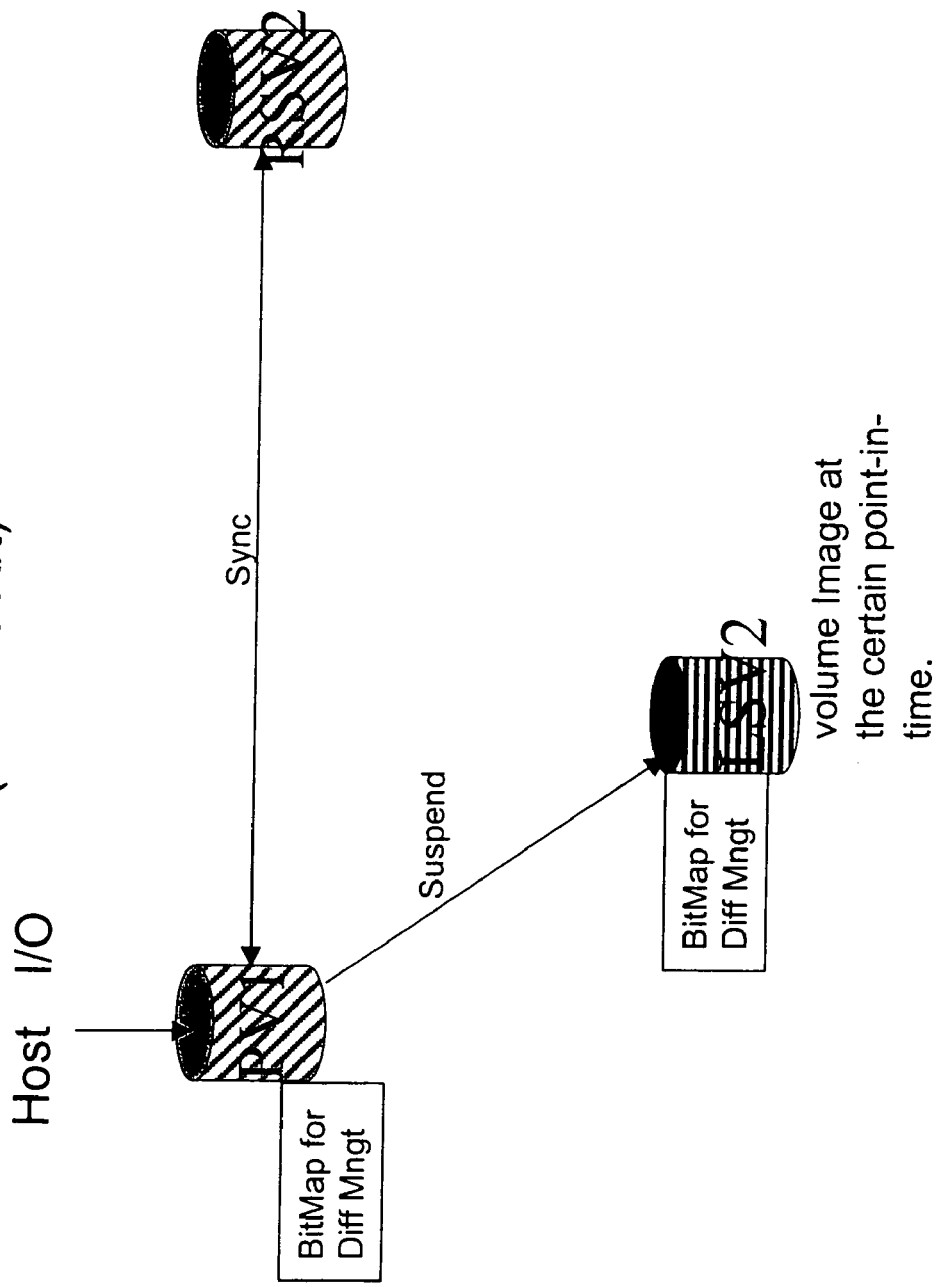

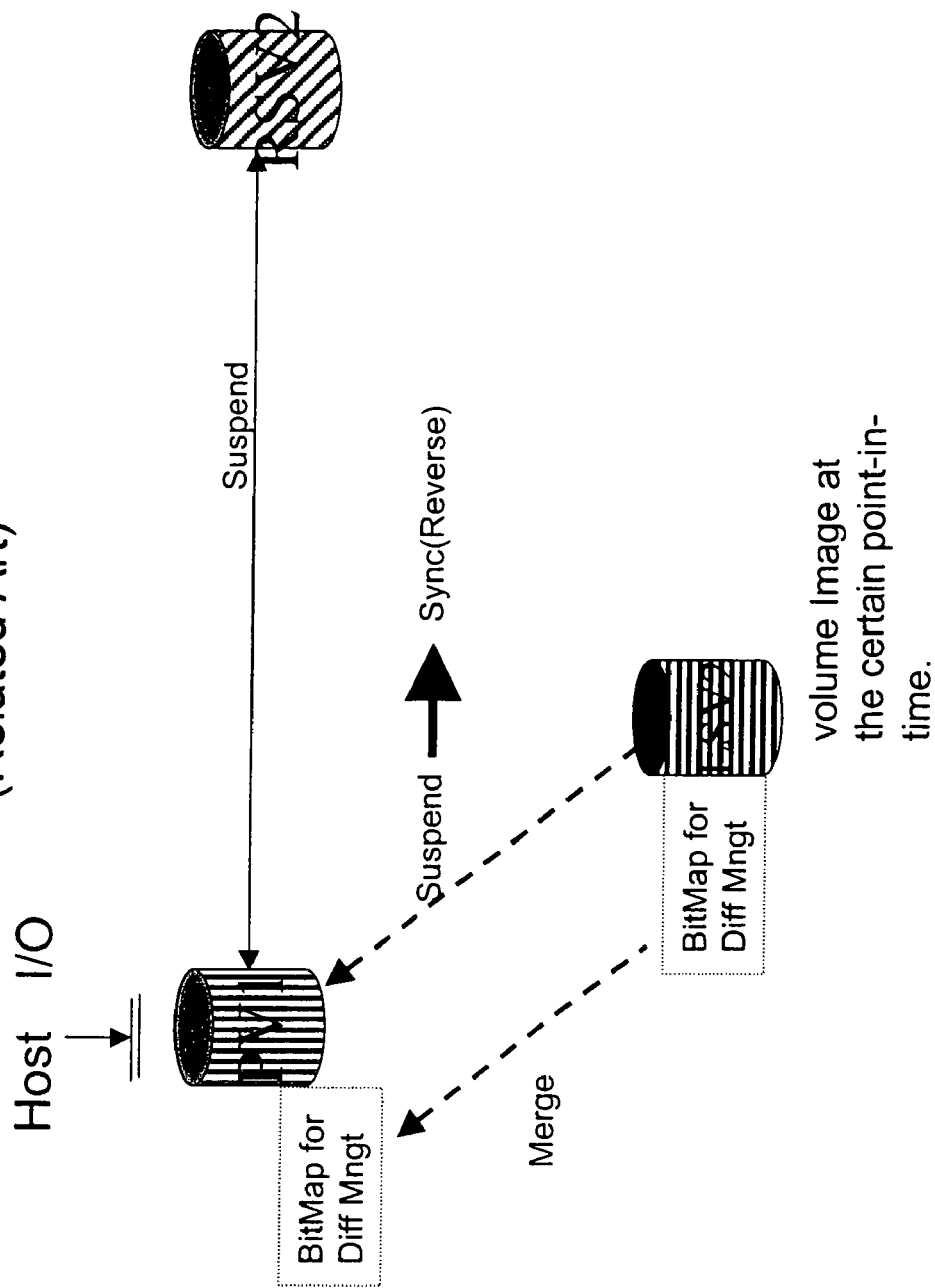

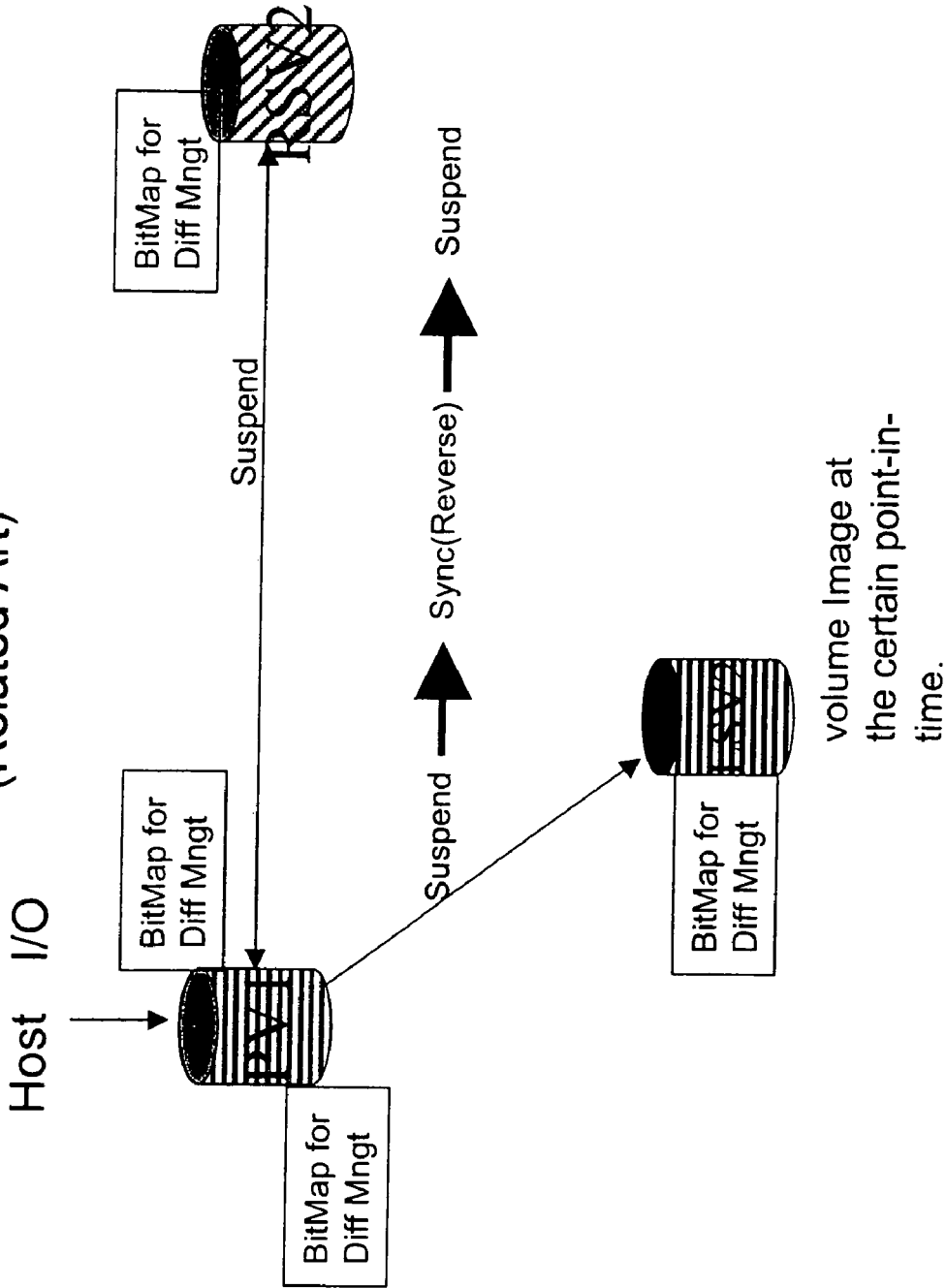

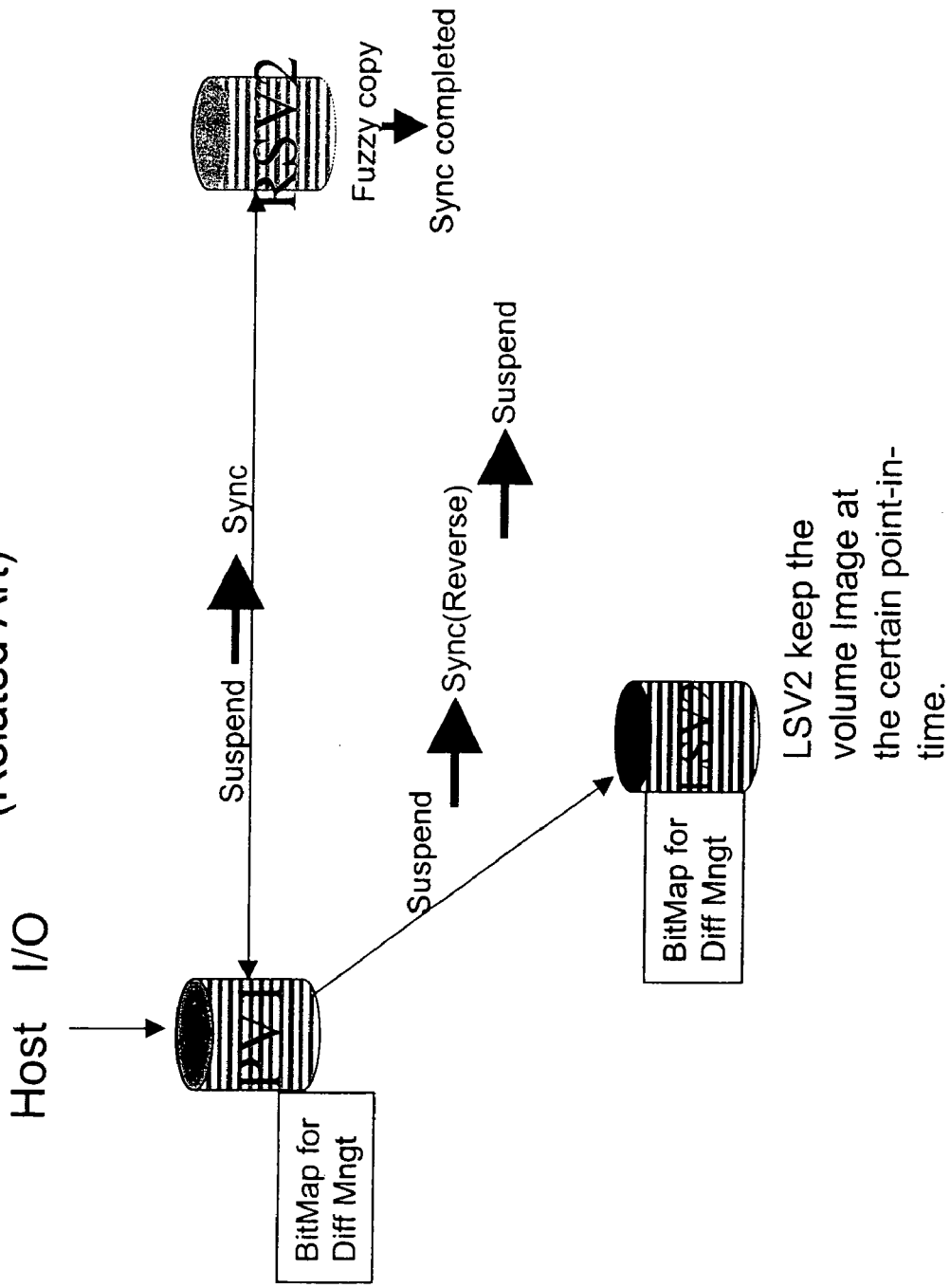

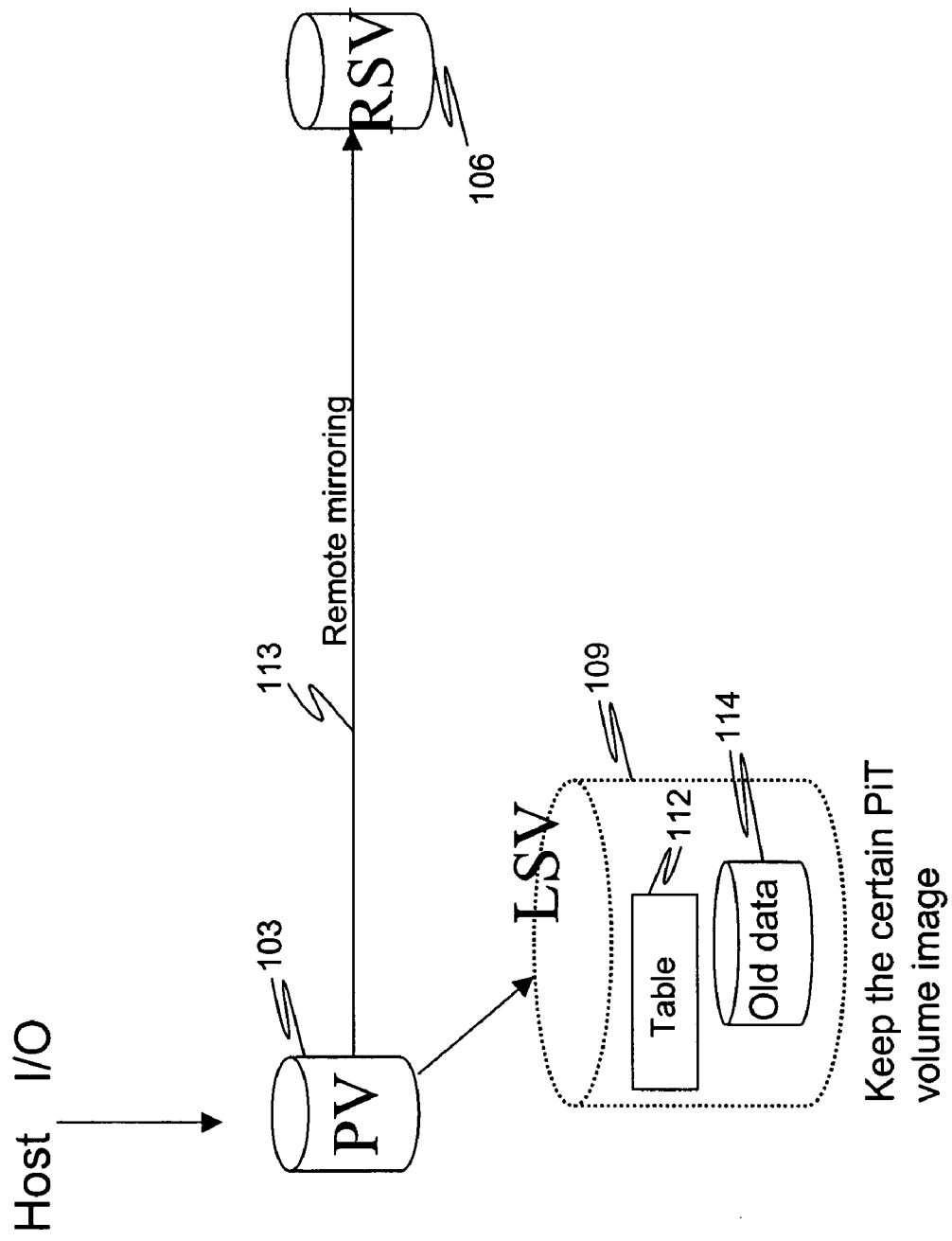

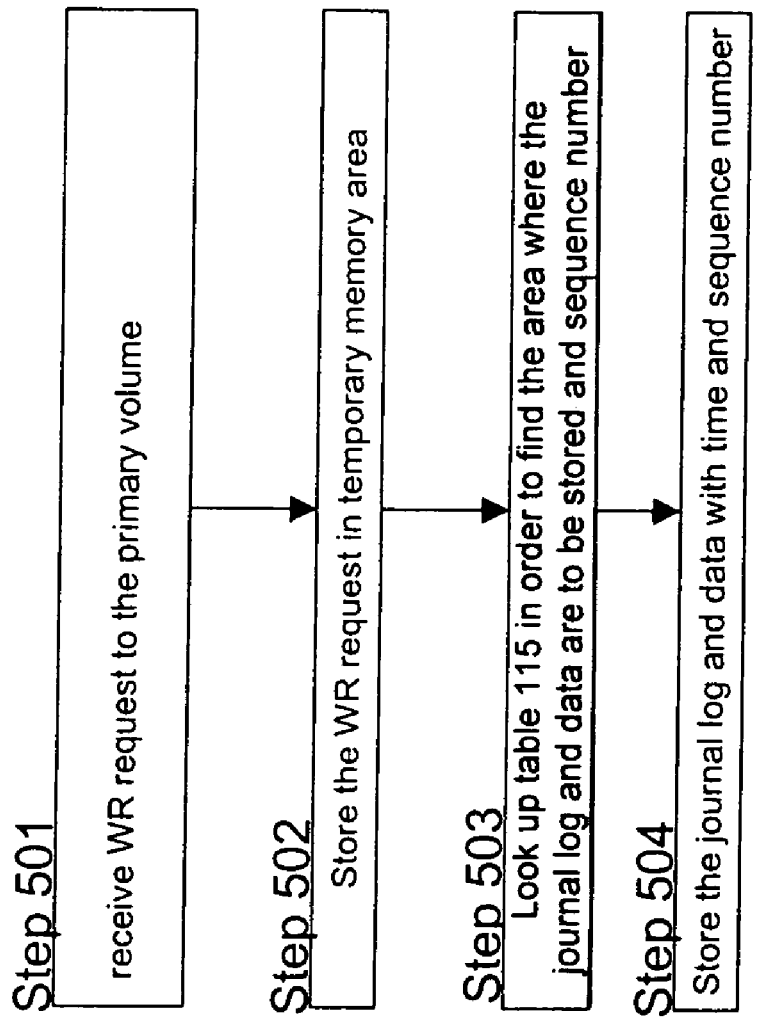

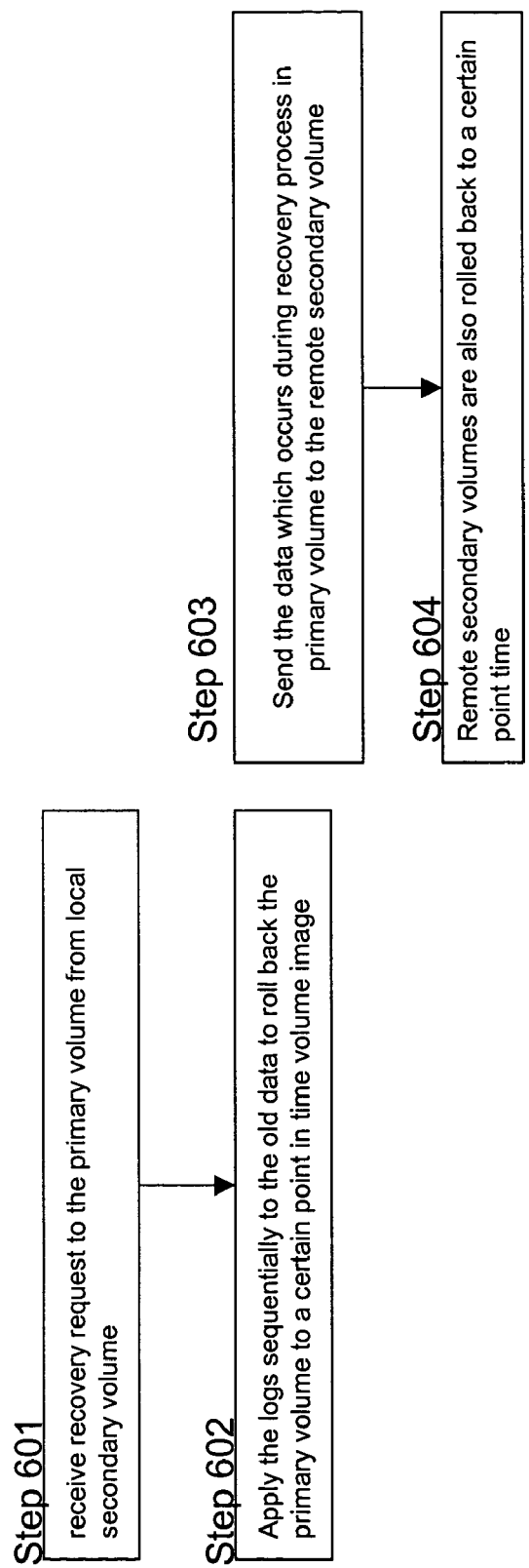

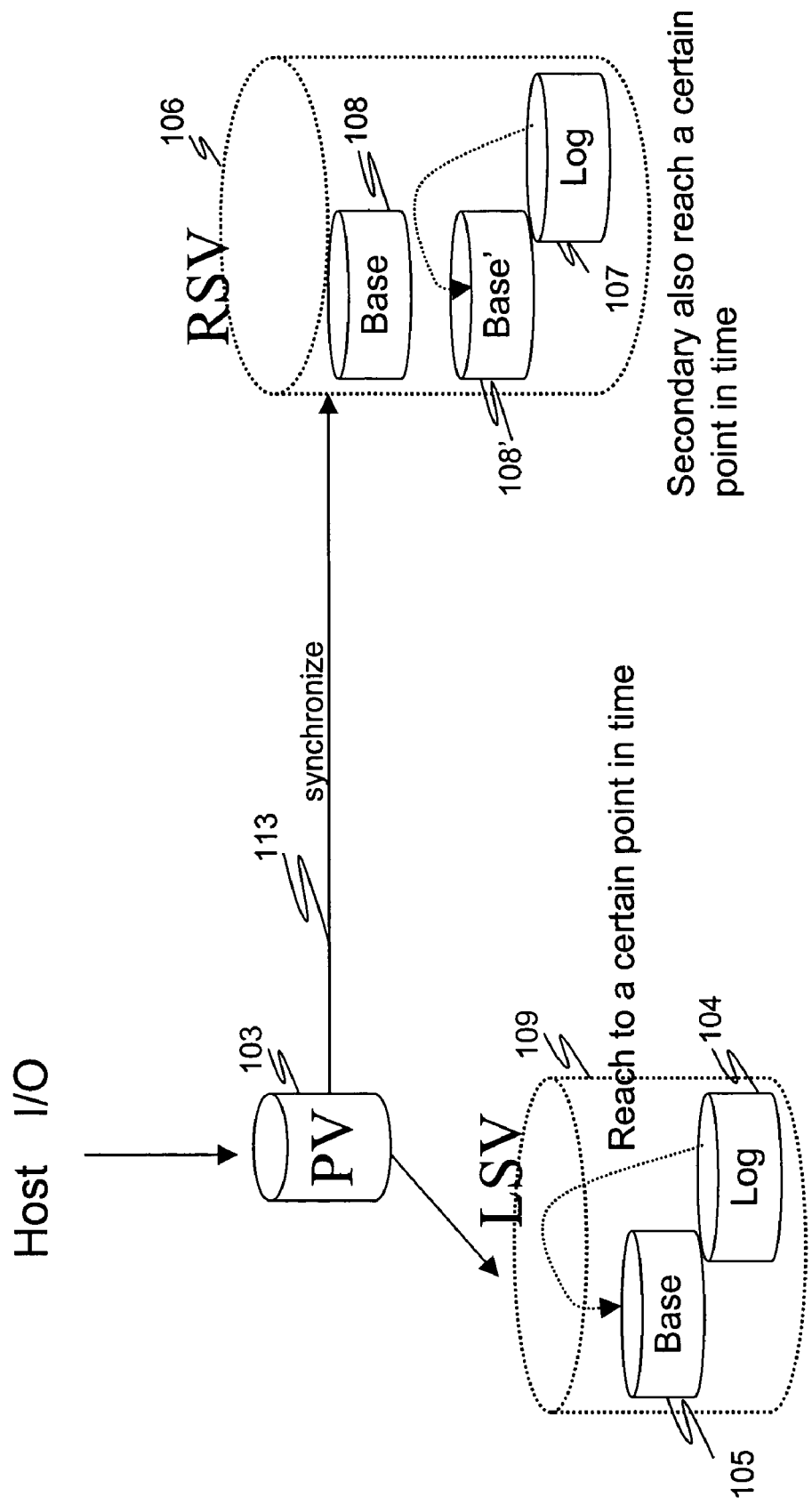

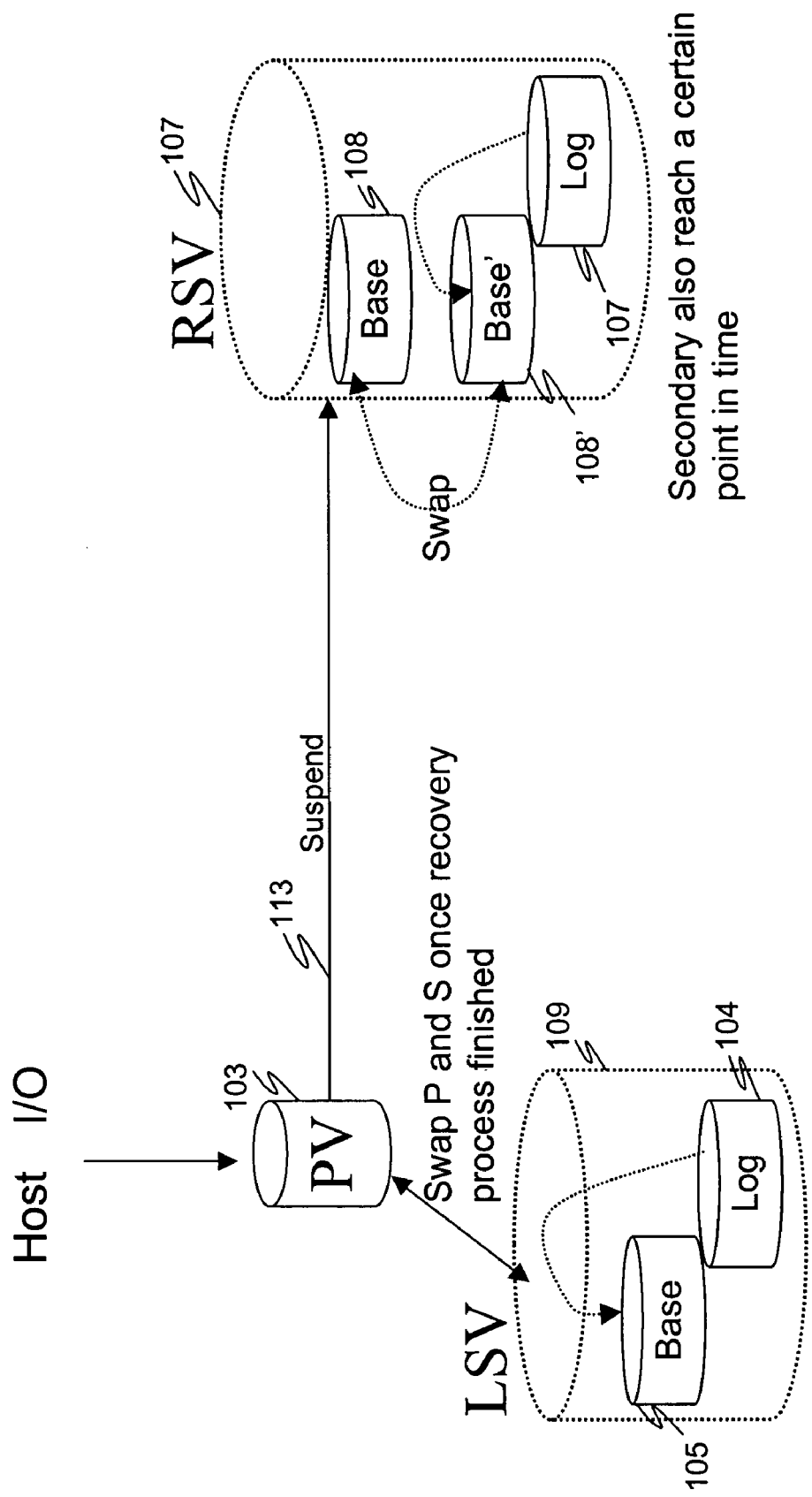

METHOD AND APPARATUS FOR RE-SYNCHRONIZING MIRRORING PAIR WITH DATA CONSISTENCY

BACKGROUND OF THE INVENTION

The present invention relates generally to techniques for storage replication. More particularly the present invention relates to a method and apparatus for re-synchronizing a remote mirroring pair and maintaining data consistency between the volumes of the remote mirroring pair.

Conventionally, there have been two types of approaches to storage-based volume replication, namely local replication and remote (copy) replication. Both technologies mirror files, file systems, or volumes without using host CPU power. When a host conducts a host input/output (I/O) such as a write I/O of data to a primary volume (PV) of a storage system, the storage system automatically copies the data to a replication (secondary) volume (SV). This mechanism ensures that PV and SV are identical.

Local replication duplicates the primary volume within a first storage system, so that when the host writes data to the PV, the first storage system also stores the data to a local secondary volume (LSV). Local replication is typically used for taking backups.

Remote replication duplicates volumes across two or more storage systems so that when the host writes data to PV, the first storage system transfers the data through paths, such as ESCON, Fibre Channel, T3, and/or IP networks, to at least one second storage system for storage in a remote secondary volume (RSV) included therein. Remote replication is typically used to enable the recovery of data from disasters, such as earthquake, flood, fire, and the like. Even if the first storage system or the whole data center at the primary site is damaged by a disaster, data is unaffected at the secondary site and business can be resumed quickly.

There are at least two modes of transferring data to implement remote mirroring between local and remote storage systems, namely synchronous mode and asynchronous mode. In the synchronous mode, all write I/O's to the PV of the first storage system are mirrored at the RSV of the second storage system. In the asynchronous mode, in response to a write I/O, the first storage system completes the write I/O and then asynchronously transfers the write data to the second storage system for storage on the RSV. Specifically, the write data to be copied to the RSV of the second storage system is temporarily stored in a queuing area, such as cache memory, disk storage, Non-Volatile Random Access Memory (NVRAM) etc. The write data is retrieved from the queuing area and then stored in the RSV of the second storage system.

Recently Volume Replication Technology has become very popular. Volume Replication gives users many benefits to manage their data stored on volumes. However, volume replication as per the conventional technique includes complicated operations in a system combining local and remote replication when it is necessary to restore data onto the primary volume and the storage systems are in the synchronous mode. For example, when a system is configured to have local and remote secondary volumes (LSV and RSV) for one primary volume (PV) as shown in FIGS. 2A–E, it is necessary to suspend and resynchronize the remote replication pair (PV and RSV) before and after restoring data from the local secondary (replica) volume LSV onto the PV.

FIG. 2A illustrates the normal state where volume replication is implemented according to the conventional technique. As per FIG. 2A PV and RSV are in the synchronous mode and PV and LSV are in the suspended state so that data written by the host to PV in a write I/O is eventually copied to LSV. Further, as illustrated in FIG. 2A, both PV and LSV contain a bit map which is an image of the state of the data stored in the respective volumes immediately before suspension is implemented. These bit maps manage the differences between the volumes.

Once an event has occurred where the PV must be restored from the LSV the synchronization between the replication pair PV and RSV must be suspended as illustrated in FIG. 2B. Thereafter, the bit maps of the respective volumes PV and LSV are merged, PV and LSV are changed from the suspended state to the synchronous mode, and data from the LSV is stored to the PV as illustrated in the FIG. 2C. In addition, it may be necessary for the write I/O's from the host to be halted.

The bit maps for each of the volumes PV and LSV are stored in the respective volumes and the replication pair PV and LSV are changed from the synchronous mode to the suspended state as illustrated in FIG. 2D with the bit maps stored in the respective volumes prior to them being placed in the suspended state. Finally, the replication pair PV and RSV are then moved from the suspended state to the synchronous mode as illustrated in FIG. 2E.

One of the disadvantages of the above described conventional technique is that there may be inconsistencies between the data stored on the respective remote replication pairs PV and RSV, thereby creating a "fuzzy" status being that updates are only made according to differences in the bit map managed by the local replication pairs PV and LSV.

Therefore there is a need to provide a technique to manage and operate the recovery process in the above described cascading replication configuration including local and remote replication to improve data consistency. Further, there is a need to provide a technique that provides time consistent volume replication even during recovery process.

SUMMARY OF THE INVENTION

The present invention provides a method and apparatus for re-synchronizing a remote mirroring pair and maintaining data consistency between the volumes of the remote mirroring pair.

Particularly the present invention provides a method and storage system for recovering and maintaining data consistency between volumes of first and second storage systems which are connected to each other via a path, the first storage system being connected to a host. According to the invention a primary volume is provided to the first storage system and a remote secondary volume is provided to the second storage system. The remote secondary volume is a copied volume of the primary volume and the primary volume and the remote secondary volume are in synchronous mode.

A local secondary volume is provided in the first storage system and has stored therein journal logs of write input/output (I/O) commands issued by the host to the primary volume to store write data in the primary volume and old data including the write data of the write I/O commands. The journal logs can for example be stored in a journal log table which manages the journal logs. Recovery of data on the primary volume based on the local secondary volume is conducted when necessary by performing recovery of data of the primary volume based on the old data and the journal logs while maintaining the primary volume and the remote secondary volume in the synchronous mode.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

FIGS. 1A and B are diagrams for explaining a local and remote mirroring configurations according to the present invention;

FIGS. 2A–E are conceptual diagrams showing the procedure for conducting recovery of data according to the conventional technique for volume replication;

FIG. 4 is a diagram showing an example of the configuration of local and remote mirroring configurations wherein the local secondary volume includes old data and journal logs managed by a journal log table according to the present invention;

FIGS. 5A–C are diagrams including a diagram for showing the content of the journal log table illustrated in FIG. 4, a conceptual diagram showing the procedure for conducting recovery of data using the old data and the journal logs, and a flowchart of a process of taking journal logs according to the present invention;

FIG. 6 is a flowchart of a process of recovery based on the old data and the journal logs according to the present invention; and FIGS. 7A–E are diagrams for explaining recovery based on journal logs and Point In Time (PIT)/Base images and a flowchart of a process of recovery based on journal logs and PIT/Base images.

DETAILED DESCRIPTION OF THE INVENTION

Figure 2B:
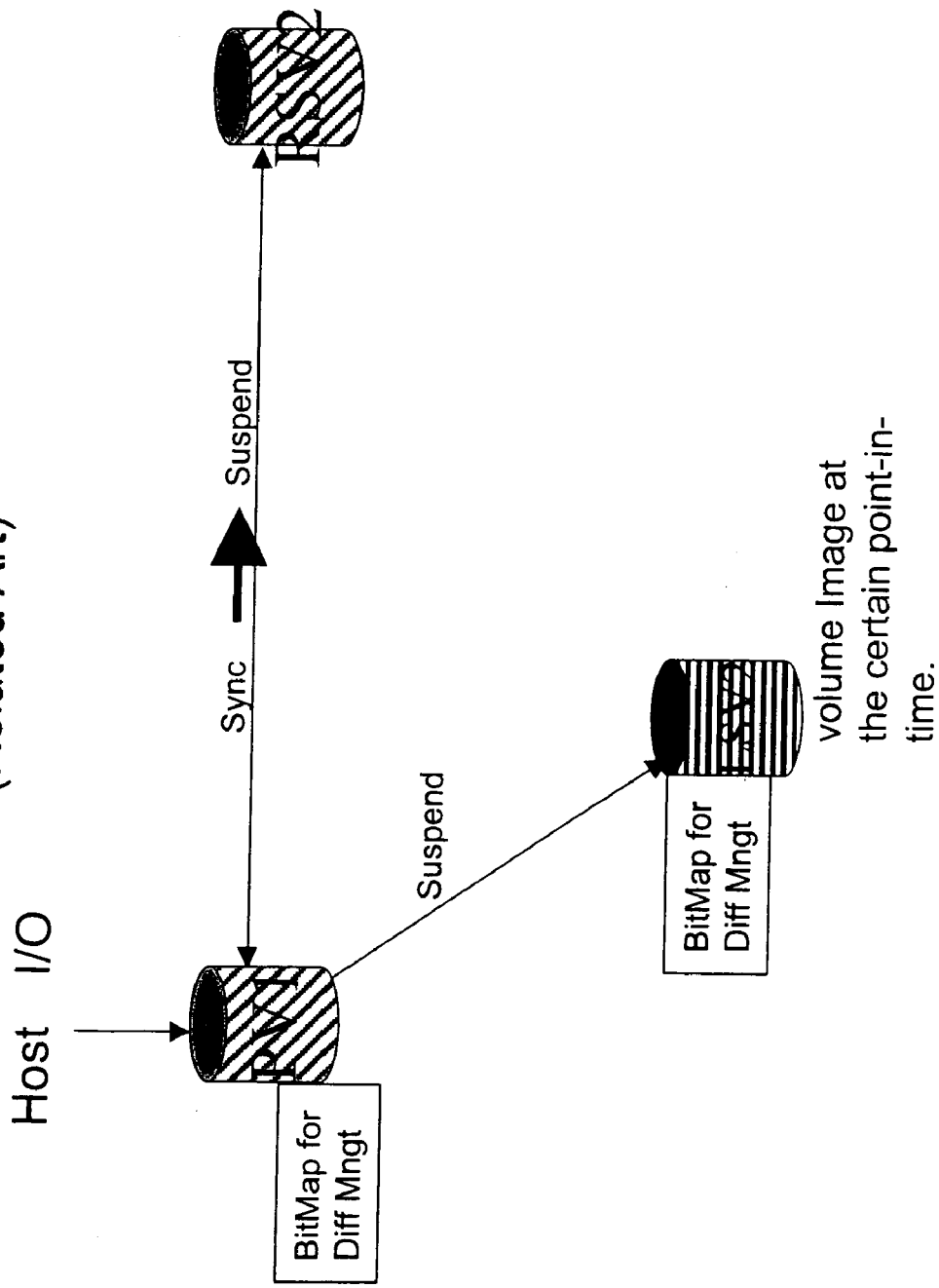

FIGS. 1A and B are diagrams for explaining local and remote mirroring configurations according to the present invention.

As per FIG. 1A a first storage system 101 and a second storage system 102 are provided and are connected to each other by a path 113. The first storage system 101 includes a primary volume (PV) 103 and a local secondary volume (LSV) 109 comprised of journal logs 104 and a base volume (old date) image 105. The primary volume 103 and the local secondary volume 109 are configured to be a local mirrored pair.

Further, as per FIG. 1A, the second storage system 102 includes a remote secondary volume 106 which includes journal logs 107 and a base volume 108. The primary volume 103 and the remote secondary volume 106 are configured to be a remote mirrored pair.

It should be noted that the present invention could for example be configured to include a plurality of the second storage systems 102 each including a remote secondary volume 106, however, for the sake of simplicity only one second storage system 102 is discussed herein and illustrated in the drawings. Also, the local secondary volume 109, included in the first storage system 101, can alternatively be configured to include a snap shot of an image of the disposition of the data on the primary volume 103 at predetermined points in time.

According to the present invention in local and remote mirroring configurations, host I/O commands issued by the host 110 to the first storage system 101, particularly in the form of write I/O's, cause data to be written not only in the primary volume 103 but also in the local secondary volume 109 and the remote secondary volume 106. The remote mirroring pair can be configured to be in the synchronous mode where data stored in the primary volume 103 is immediately stored in the remote secondary volume 106.

The basic objective of the present invention is that the journal logs 104, 107 and the base image 105, 108, or alternatively the snap shot image, are used to recover data on the primary or remote volume 103 or 106 without suspending synchronism between the primary and remote secondary volumes. Specifically according to the present invention recovery of data on the primary volume 103 is accomplished by applying commands and other information included in the journal logs 104 to the base volume or snap shot image 105 of the local secondary volume 109 with the result being stored on the primary volume 103 and/or recovery of data on the remote secondary volume 106 is accomplished by applying commands and other information included in the journal logs 107 to the base volume or snap shot image 108 of the remote secondary volume 106 with the result being stored on the remote secondary volume 106. Thus, the present invention eliminates the need to suspend the synchronous mode between the remote mirrored pair including the primary volume 103 and remote secondary volume 106. Therefore the present invention overcomes the disadvantages of the conventional technique.

FIG. 1B illustrates an alternative configuration similar to that illustrated in FIG. 1A with the exception that the second storage system 102 includes, within the remote secondary volume 106, an exact mirrored volume or a certain point in time image volume 111 of the primary volume 103 rather than the journal logs 107 and base volume 108 as per FIG. 1A. In the alternative configuration, according to the present invention, recovery of data on the primary volume 103 is accomplished by applying commands and other information included in the journal logs 104 to the base volume or snap shot image 105 of the local secondary volume 109 with the result being stored on the primary volume 103 and the remote secondary volume 106, particularly the exact mirrored volume or a certain point in time image volume 111.

Figure 3A:
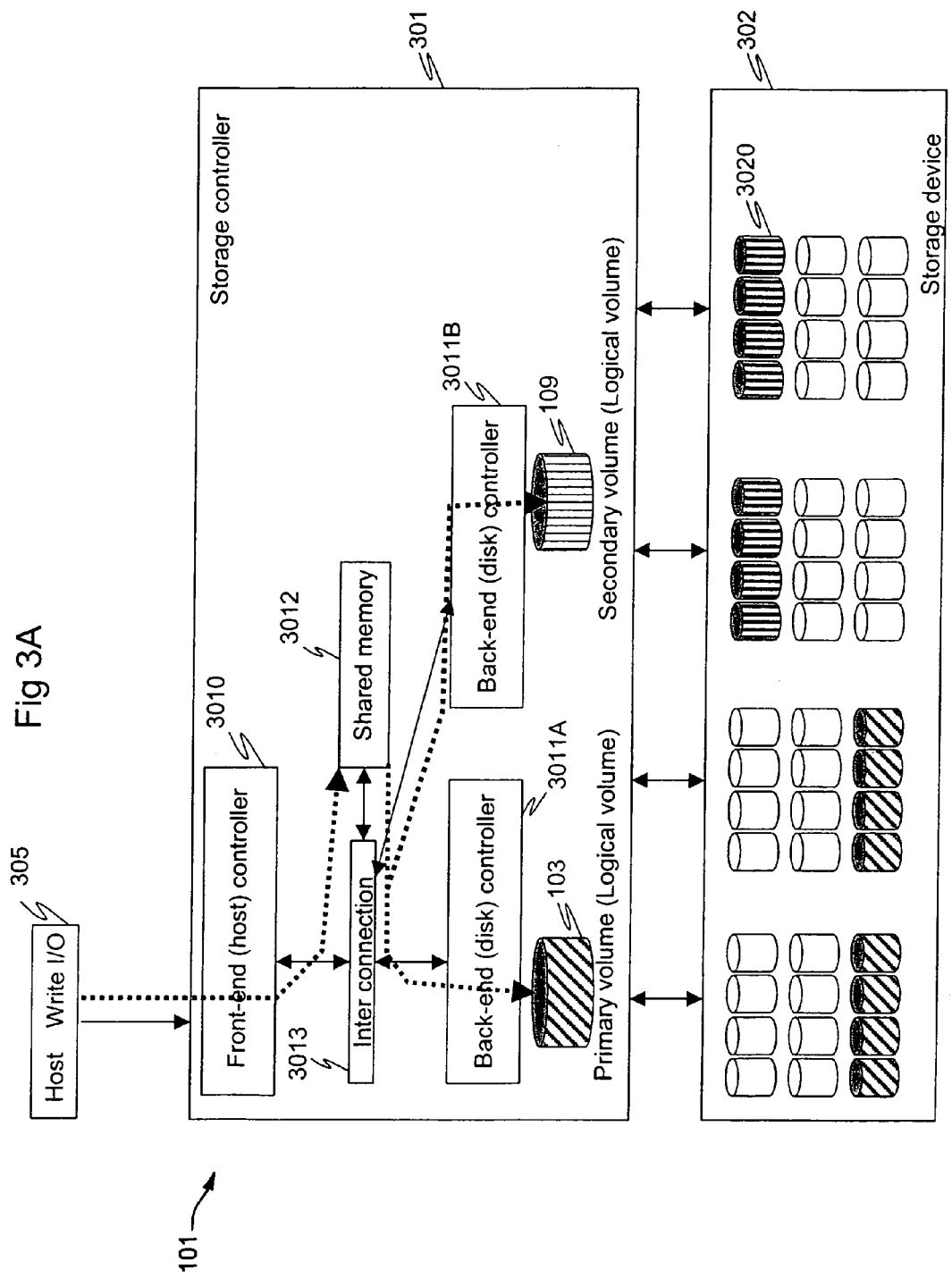
FIGS. 3A and B are diagrams for explaining the internal configuration of a storage system configured to implement the local and remote mirroring configurations according to the present invention.

FIGS. 3A and B illustrate the internal configuration of storage systems configured to implement local and remote mirroring according to the present invention.

As illustrated in FIG. 3A, the internal configuration of the first storage system 101 illustrated in FIG. 1A could, for example, include a storage controller 301 which is connected so as to control a storage device 302 in response to host write I/O's 305. As per FIG. 3A, the storage controller 301 includes a front end controller 3010 for interfacing with a channel of a host, back end controllers 3011A and 3011B for interfacing with the storage device, shared memory 3012 for caching data including control data transferred between the host and storage device 302 and an interconnection apparatus 3013 for interconnecting the front end controller 3010, back end controllers 3011A and B and shared memory 3012. Back end controller 3011A interfaces to the primary volume 103 and back end controller 3011B interfaces to the local secondary volume 109. It should be noted that the primary volume 103 and the local secondary volume 109 are logical volumes which are defined on a plurality of disk devices 3020 included in the storage device 302.

As illustrated by the arrows in FIG. 3A, a host write I/O 305 including command and write data is received by the front end controller 3010 and then stored in the shared memory 3012 via the interconnection apparatus 3013. The host write I/O including the command and write data is retrieved from the shared memory 3012 via the interconnection apparatus 3013 and transmitted to the back end controllers 3011A and B so as to store the write data in mirrored primary and secondary volumes 103 and 109.

Figure 3B:
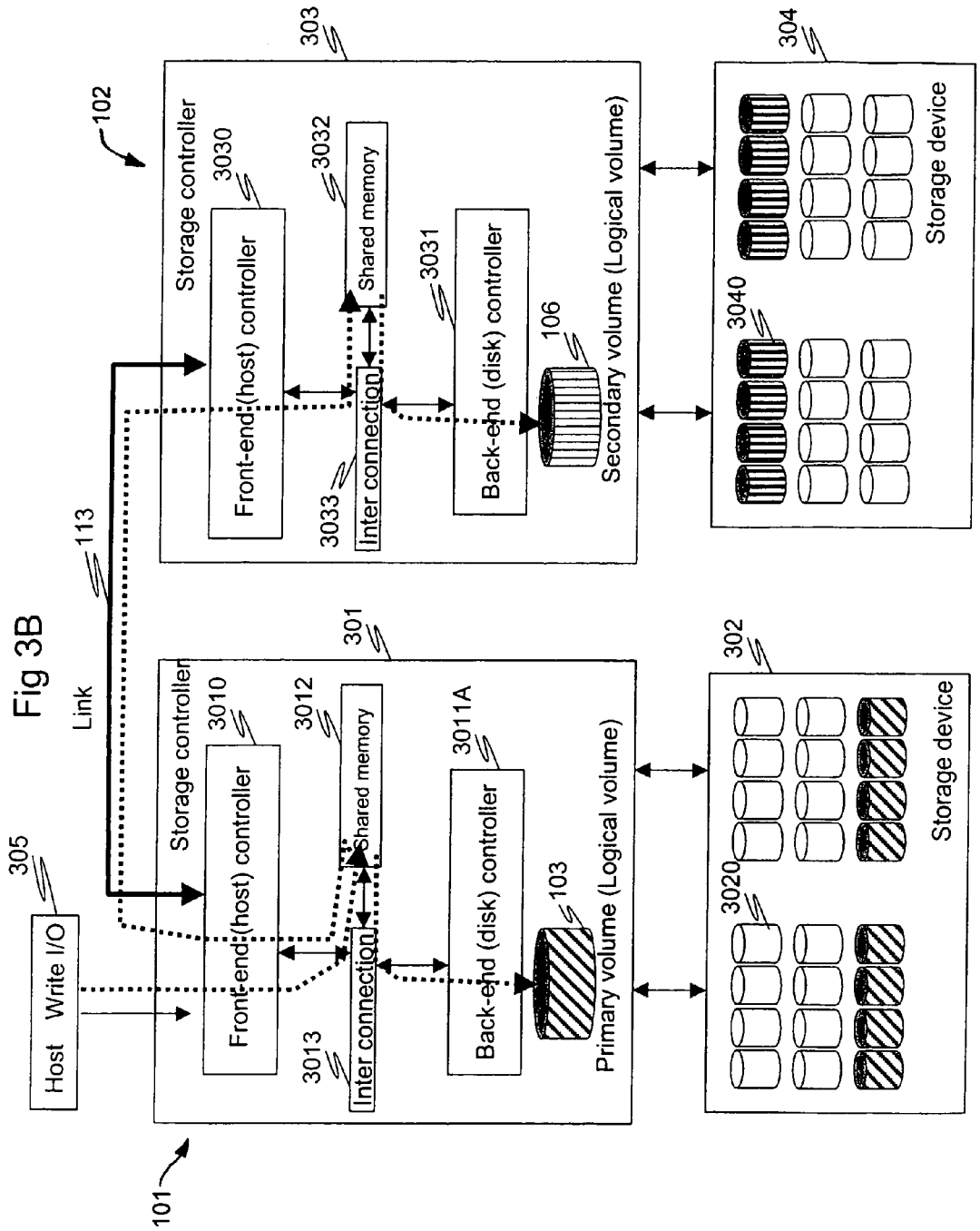

FIG. 3B illustrates a configuration similar to that illustrated in FIG. 3A with the exception that the internal configuration of the second storage system 102 is provided and is shown as being connected to the first storage system 101. The second storage system 102 includes a storage controller 303 and a storage device 304. FIG. 3B does not illustrate that the storage controller 301 of the first storage system includes the back end controller 3011 B and the secondary volume 3015 as per FIG. 3A. However, such apparatus could, for example, be included and was not shown to simplify the drawing.

The storage controller 303 of the second storage system 102 includes a front end controller 3030 which is connected by a link 113 to the front end controller 3010 of the storage controller 301 of the first storage system 101. The storage controller 303 of the second storage system 102 further includes a back end controller 3031 which interfaces with the remote secondary volume 106, shared memory 3032, and interconnection apparatus 3033 which interconnect the front end controller 3030, back end controller 3031 and shared memory 3032. The storage device 304 includes a plurality of disk devices 3040.

As illustrated by the arrows in FIG. 3B, a host write I/O 305 including command and write data is received by the front end controller 3010 and stored in the shared memory 3012 via the interconnection apparatus 3013. The command and write data of the host write I/O are retrieved from the shared memory 3012 and transmitted through the interconnection apparatus 3013 to the back end controller 3011A and then stored on the primary volume 103. The write data and command of the host write I/O retrieved from the shared memory 3012 are also transmitted via the front end controller 3010 through the link 113 to the front end controller 3030 of the storage controller 303 of the second storage system 102. The command and write data of the host write I/O are stored in shared memory 3032 via the interconnection apparatus 3033. The command and write data are retrieved from the shared memory 3032 via the interconnection apparatus 3033 and transmitted to the back end controller 3031 and stored on the remote secondary volume 106. As noted above, the remote secondary volume 106 is defined as a logical volume within a plurality of disk devices 3040 of the storage device 304.

FIG. 4 illustrates an example of local and remote mirroring configurations according to the present invention wherein the local secondary volume (LSV) 109 includes old data 114, which could for example be a certain point in time (PIT) image, and journal logs in the form of a journal log table 112 which are used during recovery to recover data on the primary volume (PV). As illustrated in FIG. 4, the remote mirroring pair including the primary volume (PV) 103 and the remote secondary volume (RSV) 106 is set to the synchronous mode. According to the present invention, when recovery is necessary with respect to the PV 103, recovery is accomplished by applying the journal logs from the journal log table 112 to the old data 114 so as to recover the PV.

Figure 5A:
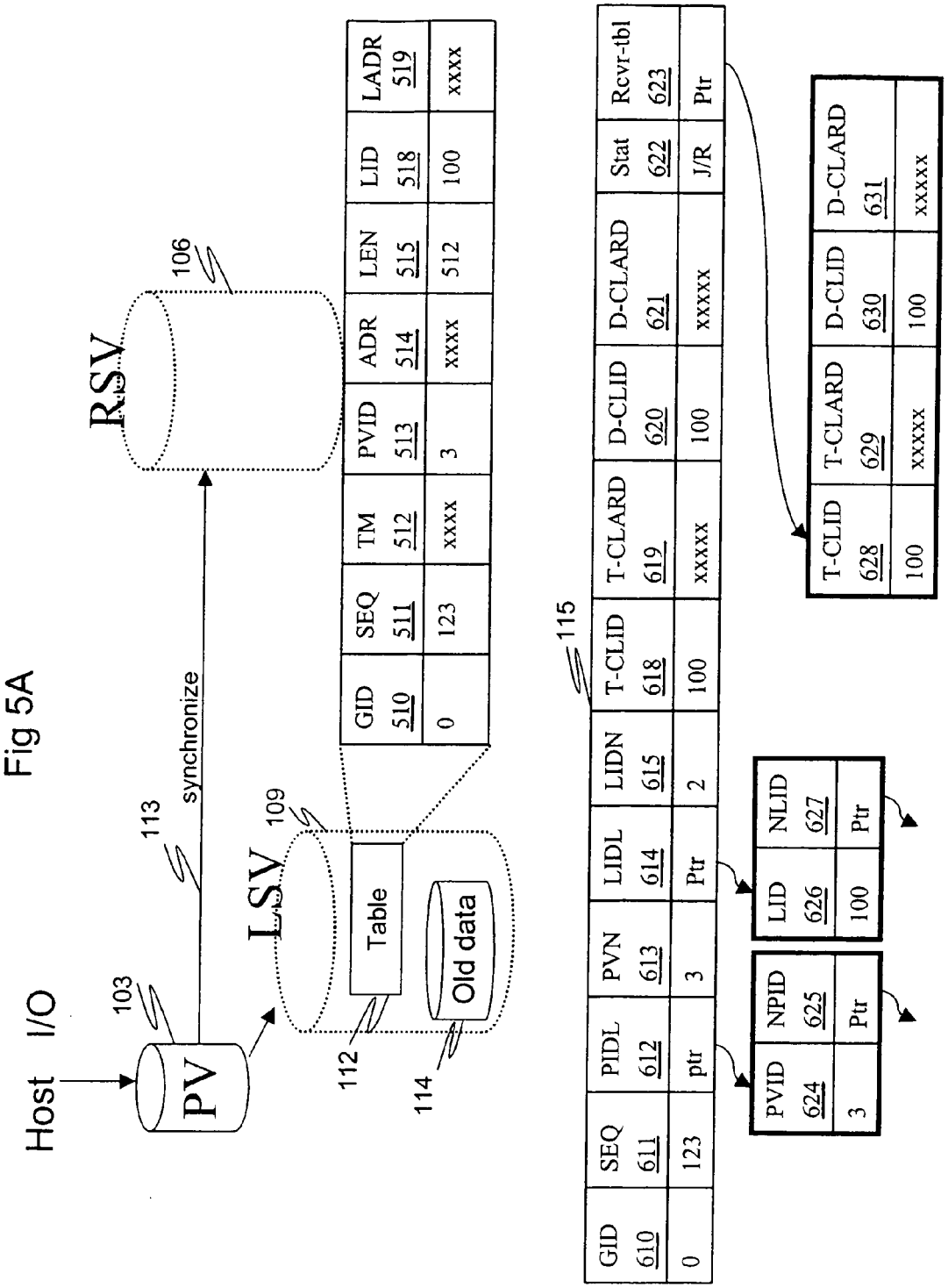

FIG. 5A illustrates the content of the journal log table 112. The journal log table 112 as illustrated in FIG. 5A contains information included in or related to the sequence of write I/Os issued by the host to the PV 103. This information includes data stored according to a plurality of different fields including group identification (ID) 510 a unique identifier for the group of journal logged snap shot volumes, sequence number 511 a current sequential number for the journal log, time 512 the time/date when the journal log was stored, primary volume ID 513 a unique identifier for the primary volume 103, address 514 an address on the primary volume 103 where the data is stored, length 515 providing information of the length of the data being stored, log volume ID 518 providing an identifier of the volume at which the journal log is stored, and address 519 providing an address of the log volume where the current journal log is stored.

In place of or in addition to the journal log table 112 a journal function management table 115 could also be provided and as such could be stored in memory accessible by the storage controllers 301 and 303. The journal function management table 115 can be used for managing the process of taking journal logs and the process of recovery using the journal logs. The journal function management table 115 stores information regarding journal logs according to various fields including group ID 601 providing a unique identifier for the group of journal log volumes, sequence number 611 providing a sequence number of the current journal log, primary volume ID list 612 providing a pointer to the stored area of the primary volume, primary volume number 613 providing a number of the primary volume to which the group of journal log volumes belongs, journal log volume ID list 614 providing a pointer to the stored area of the journal log volume information, journal log volume ID number 615 providing a number of the journal log volumes belonging to the group, T-CLID 618 providing an ID of the journal log volume where the next journal log is to be stored, T-CLARD 619 providing an address of the journal function management table where the next journal log is to be stored, D-CLID 620 providing an ID of the journal log volume where the next journal log is to be stored, D-CLARD 621 providing an address of the journal log where the next journal data is to be stored, Stat 622 providing a status of the journal mode, whether journaling or recovery is being implemented, Rcvr-tbl 623 providing a pointer to the address of the journal log and data area information for recovery, T-CLID 628 providing an ID of the journal log volume where the next applied journal log is stored, T-CLARD 629 providing an address of the journal log area where the next applied journal log is stored, D-CLID 630 providing an ID of the journal data volume where the next applied journal data is stored and D-CLARD 631 providing an address of the journal data area where the next applied journal data is stored. It should be further noted that PIDL 612 could, for example, include additional fields such as PVID 624 and NIPD 625. Further, LIDL 614 could also include further fields such as LID 626 and NLID 627.

Figure 5B:
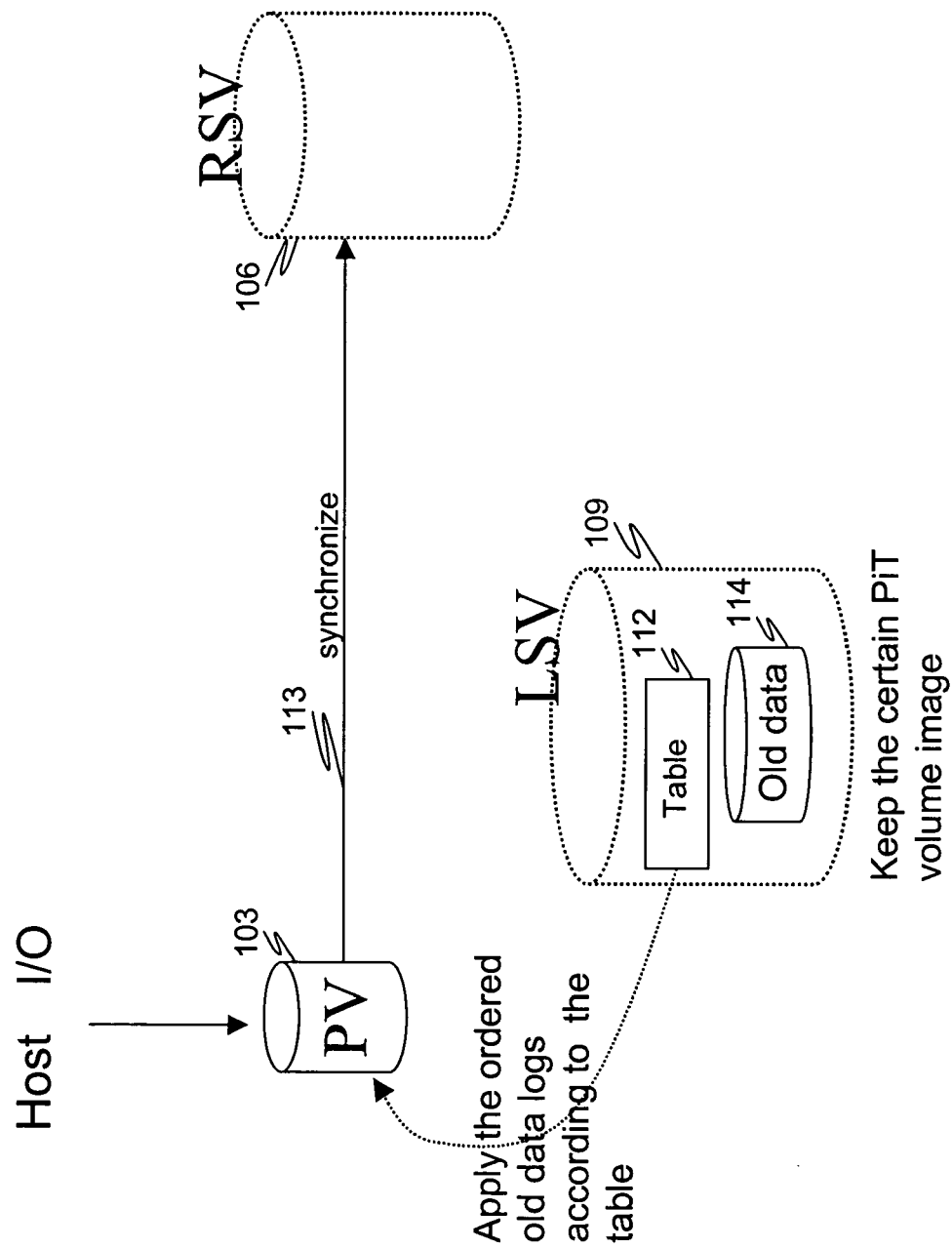

FIG. 5B is a conceptual diagram showing the procedure for conducting recovery of data using the old data and the journal logs. Particularly, according to FIG. 5B the local secondary volume 109 includes a journal log table 112 which manages journal logs in a manner so as to permit their use during recovery, and old data 114 representing a certain point in time (PT) image of the data on the LSV 109. As per the present invention, when recovery is necessary with respect to the PV 103, recovery is accomplished by applying the journal logs in the log journal log table 112 to the old data 114 thereby bringing the data stored on the LSV 109 to represent a certain PIT image of the PV 103. Thus, the PIT volume image is stored to the PV 103 thereby recovering the PV 103 to a certain PIT image. According to the present invention, as the write I/O's of the journal logs in the journal log table 112 are applied to the PV 103, corresponding write I/O's are sent to the RSV 106 so as to maintain synchronism between the PV 103 and the RSV 106. Therefore, according to the present invention synchronism and data consistency can be maintained between remote mirroring pairs, namely the PV 103 and the RSV 106.

FIG. 5C is a flowchart which describes the steps used to take (record) journal logs according to the present invention. As illustrated in the flowchart of FIG. 5C, the first storage system 101 including the primary volume 103 receives a host I/O 110, such as a write request (write I/O) which is intended to store write data in the PV 103 (step 501). The first storage system 101 stores the write I/O and the write data in a temporary memory area such as the shared memory 3012 as shown in FIG. 3A (step 502). The first storage system 101 could, for example, include a journal function management table 115 for managing the process of taking journal logs and the process of recovery using the journal logs as represented in for example a journal log table 112. The first storage system 101, based on the write I/O, searches the journal function management table 115 so as to find an area where the journal log and the write data are to be stored and to obtain a sequence number for the current write I/O so as to identify the journal log to be stored (step 503). In addition information of a Volume ID and an address of the next Journal log table entry and information of Volume ID and address of next journal log data to be stored are obtained from the journal function management table 115. Thereafter, the journal log and the write data are stored, with information indicating the time of storage and the sequence number of the journal log, in the area indicated by the journal function management table 115 (step 504), and the journal function management table 115 is updated for the next write I/O.

FIG. 6 is a flowchart of the process of recovery of data on the primary volume 103 based on the old data 114 and the journal logs as represented by the journal log table 112 according to the present invention. As illustrated in FIG. 6, the first storage system 101 receives a recovery request so as to recover data on the primary volume 103 from the local secondary volume 109 (step 601). So as to perform this recovery the present invention applies the journal logs obtained according to the journal function management table 115 and/or the journal log table 112 sequentially to the old data 114 with the result being stored in the primary volume 103 so as to roll back the primary volume 103 to a certain in time volume image (step 602). In addition, according to the present invention, the data as written to the primary volume 103 so as to roll back the data on the primary volume to a certain point in time volume image, is sent to the remote secondary volume 106 (step 603). Based on the data sent from the primary volume 103, the remote secondary volume 106 is also rolled back to a certain point in time volume image corresponding to the primary volume 103 (step 604).

Figure 7A:
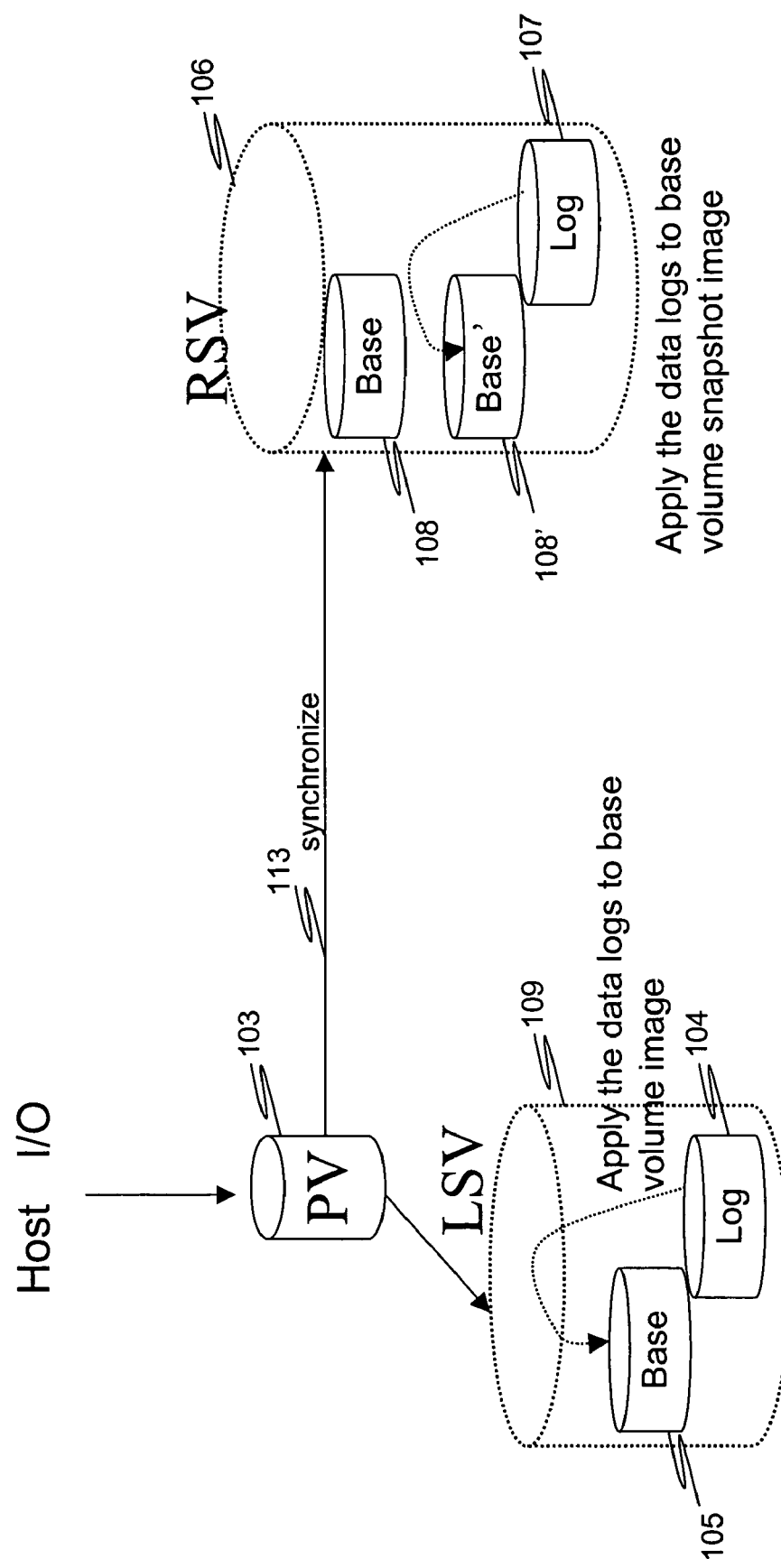
Figure 7D:
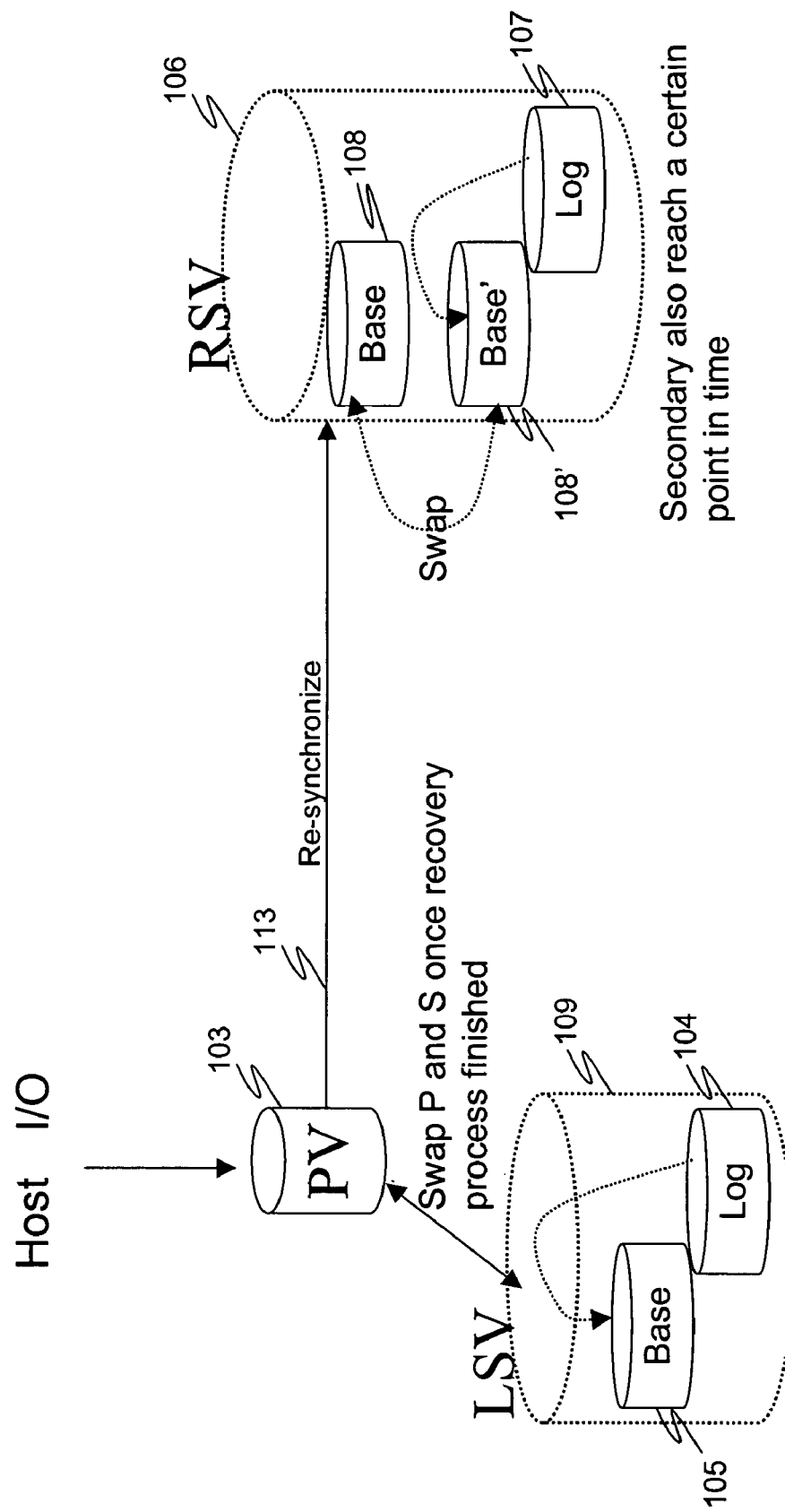
Figure 7E:
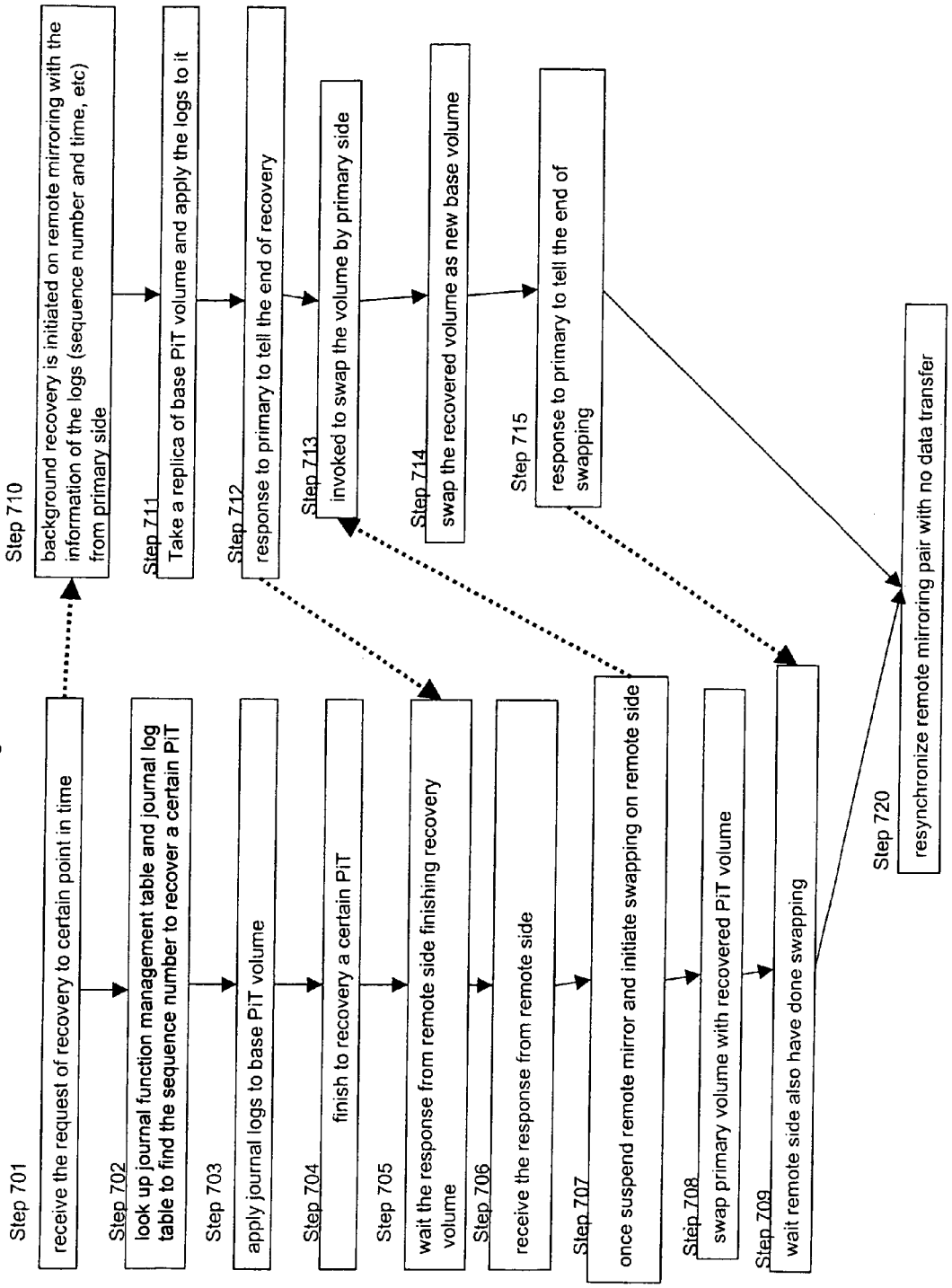

FIGS. 7A–E are diagrams including a flowchart or explaining the recovery process based on the journal logs and the base volume image wherein the journal logs are used for keeping point in time images of the primary volume 103 on both the local secondary image 109 and the remote secondary image 106. Particularly, as illustrated in FIG. 7A, the primary volume 103 is synchronized with the remote secondary volume 106 and such synchronization is maintained even during recovery according to the present invention. The flowchart of this recovery process is illustrated in FIG. 7E.

As illustrated in FIG. 7A, the primary volume 103 is synchronized with the remote secondary volume 106 which includes a base volume 108 and journal logs 107 which are used to conduct recovery of the base volume 108 based on a replica of the base volume 108, namely base volume 108'. The local secondary volume 109 includes a base volume 105 and journal logs 104 which are applied to the base volume image 105 so as to conduct recovery.

As illustrated in the flowchart of FIG. 7E, when the first storage system 101 receives a request for recovery of the primary volume 103 to a certain point in time (step 701) a corresponding request is also sent to the second storage system 102 so as to initiate background recovery on the remote secondary volume 106 (step 710). Continuing from step 701 the first storage system 101 searches the journal function management table 115 and the journal log table 112 so as to find the sequence number to recover a certain point in time image of the primary volume 103 (step 702). Once the sequence number is obtained, the journal logs are applied to the base volume 105 (step 703) until recovery of a certain point in time image is reached as illustrated in FIG. 7B (step 704). Thereafter, the first storage system 101 waits for a notice that the recovery process on the second storage system 102 including the remote secondary volume 106 has finished (step 705).

According to the flowchart of FIG. 7E, continuing from step 710, when the background recovery on the remote secondary volume 106 is initiated using information of the journal logs (sequence number and time, etc.) from the primary volume 103. A replica of the base volume 108, namely base volume 108' is taken and the journal logs corresponding to the sequence and time information are applied to the base replica volume 108' until a certain point in time image is reached as illustrated in FIG. 7B (step 711). A notice is sent to the first storage system 101 including the primary volume 103 so as to indicate the end of the recovery process on the remote secondary volume (step 712). The first storage system 101, being in the state of waiting for the notice from the second storage system 102 as to whether the recovery process has been finished, receives such notice when issued by the second storage system 102 (step 706). Upon receipt of the notice from the second storage system 102 that the recovery process initiated thereon has been completed, the synchronous mode between the primary volume 103 and the remote secondary volume 106 is briefly suspended and swapping of the replica base volume 108' with the base volume 108 is initiated by sending a notice to the second storage system 102 as illustrated in FIG. 7C (step 707). The swapping of the replica base volume 108' with the base volume 108 is invoked (step 713) so that the replica base volume 108' is henceforth used as the new base volume 108 (step 714) and a notice that the swapping has been conducted in the remote secondary volume is issued to the first storage system (step 715).

According to the flowchart in FIG. 7E, continuing from step 707, the first storage system 101 swaps the primary volume 103 with the recovered base volume 105, thereby recovering the primary volume 103 to a certain point in time image (step 707) and then waits for notice from the remote secondary volume 106 that the swapping therein between the replica base volume 108' and the base volume 108 has been completed (step 709). Once the swapping has been completed at the remote secondary volume 106 a notice indicating such is sent from the second storage system 102 to the first storage system 101 (step 715). Once the volume swapping has been completed on both on the first storage system 101 and the second storage system 102, re-synchronization between the first storage system 101 and the second storage system 102 (remote mirroring pair) is conducted as illustrated in FIG. 7D (step 720).

Thus, as described above the present invention provides a method and apparatus for re-synchronizing a remote mirroring pair and maintaining data consistency between the volumes of the remote mirroring pair including first and second storage systems which are connected to each other via a path, the first storage system being connected to a host. The present invention essentially operates by providing a primary volume to the first storage system and a remote secondary volume to the second storage system, wherein the remote secondary volume is a copied volume of the primary volume and the primary volume and the remote secondary volume are in the synchronous mode. A local secondary volume is provided in the first storage system and has stored therein journal logs of write I/O's issued by the host to the primary volume to store write data in the primary volume and old data including the write data of the write I/O commands. The journal logs can for example be stored in a journal log table which manages the journal logs. Unique according to the present invention is that recovery of data on the primary volume based on the local secondary volume is conducted when necessary by applying the journal logs to the old data without suspending the synchronous mode between the primary volume and the remote secondary volume.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A method for recovering and maintaining data consistency between volumes of first and second storage systems which are connected to each other via a path, the first storage system being connected to a host, the method comprising the steps of:
   providing a primary volume to the first storage system and a remote secondary volume to the second storage system, the remote secondary volume being a copied volume of the primary volume, the primary volume and the remote secondary volume being in synchronous mode;
   providing a local secondary volume in the first storage system, the local secondary volume being a logical volume separate from the primary volume, the local secondary volume having stored therein journal logs of write input/output (I/O) commands issued by the host to the primary volume to store write data in the primary volume and old data including write data of the write I/O commands; and
   conducting recovery of data on the primary volume from the local secondary volume when necessary by performing recovery of data of the primary volume based on the old data and the journal logs while maintaining the primary volume and the remote secondary volume in the synchronous mode.

2. A method according to claim 1, wherein the journal logs are stored in a journal log table.

3. A method according to claim 2, wherein a journal function management table is provided to be accessible and used by said first storage system to manage a process of taking journal logs as represented by said journal log table and a process of recovery of said primary volume to a certain point in time image based on the journal logs.

4. A method according to claim 3, wherein when said journal function management table is used to manage a process of taking journal logs, said journal log table is referred to for obtaining information indicating a location where a journal log including said write I/O command and said write data are to be stored and a sequence number for use in identifying said journal log, and said journal log and sequence number are stored in said location indicated by said information.

5. A method according to claim 4, wherein when said journal function management table is used to manage a process of recovery of said primary volume to a certain point in time image based on the journal logs, said journal log table is referred to sequentially apply the journal logs to the old data according to sequence numbers stored with the journal logs with the result being stored in the primary volume, thereby recovering the primary volume to a certain point in time image.

6. A method according to claim 1, wherein the recovery of data on the primary volume is performed by applying the journal logs to the old data and storing the result in the primary volume.

7. A method according to claim 6, wherein said recovery of the primary volume while maintaining the primary volume and the remote secondary volume in the synchronous mode is conducted by sending the result of applying the journal logs to the old data to the second storage system and storing the result in the remote secondary volume.

8. A method according to claim 1, wherein each of said first and second storage systems comprises:
   a storage device having a plurality of disk drives each for storing data; and
   a storage controller for controlling said storage device, wherein said storage controller comprises:
   a front end controller for interfacing with a channel of an external device,
   at least one back end controller for interfacing with said storage devices,
   a shared memory for temporarily storing data including control data transferred between said external device and said storage device, and
   an interconnection apparatus for interconnecting said front end controller, said at least one back end controller and said shared memory.

9. A method according to claim 8, wherein said primary volume of said first storage system is a logical volume supported by said disk drives included in said storage device, and
   wherein said local secondary volume of said first storage system is a logical volume supported by said disk drives included in said storage device.

10. A method for recovering and maintaining data consistency between volumes of first and second storage systems which are connected to each other via a path, the first storage system being connected to a host, the method comprising the steps of:
   providing a primary volume to the first storage system and a remote secondary volume to the second storage system, the remote secondary volume being a copied volume of the primary volume, the primary volume and the remote secondary volume being in synchronous mode;

providing a local secondary volume in the first storage system, wherein the local secondary volume has stored therein journal logs of write input/output (I/O) commands issued by the host to the primary volume to store write data in the primary volume and a base volume including an image of the primary volume at a certain point in time, wherein the remote secondary volume has stored therein journal logs of write input/output (I/O) commands issued by the host to the primary volume and sent to said second storage system to store write data in the remote secondary volume, a base volume including a copied image of the primary volume and a replica base volume including a copy of the base volume; and conducting recovery of data on the primary volume from the local secondary volume when necessary by performing recovery of data of the primary volume based on the base volume and the journal logs included in the local secondary volume while maintaining the primary volume and the remote secondary volume in the synchronous mode.

11. A method according to claim 10, wherein the recovery of data on the primary volume is performed by applying the journal logs to the base volume and storing the result in the primary volume.

12. A method according to claim 11, wherein the recovery of data on the remote secondary volume is performed by applying the journal logs to the replica base volume, and storing the result in the base volume of the remote secondary volume.

13. A method according to claim 12, wherein storing the result of applying the journal logs to the replica base volume in the base volume of the remote secondary volume includes swapping the replica base volume for the base volume.

14. A method according to claim 11, wherein storing the result of applying the journal logs to the base volume in the primary volume includes swapping the base volume for the primary volume.

15. A storage system comprising:

a first storage apparatus which is connected to a host and includes a primary volume; and a second storage apparatus which is connected to said first storage apparatus via a path and includes a remote secondary volume, wherein the remote secondary volume is a copied volume of the primary volume and the primary volume and the remote secondary volume are in synchronous mode, wherein said first storage apparatus further includes a local secondary volume, the local secondary volume having stored therein journal logs of write input/output (I/O) commands issued by the host to the primary volume to store write data in the primary volume and old data including write data of the write I/O commands, and wherein recovery of data on the primary volume from the local secondary volume is conducted by performing recovery of data of the primary volume based on the old data and the journal logs while maintaining the primary volume and the remote secondary volume in the synchronous mode.

16. A storage system according to claim 15, wherein the journal logs are stored in a journal log table.

17. A storage system according to claim 16, wherein a journal function management table is provided to be accessible and used by said first storage system to manage a process of taking journal logs as represented by said journal log table and a process of recovery of said primary volume to a certain point in time image based on the journal logs.

18. A storage system according to claim 17, wherein when said journal function management table is used to manage a process of taking journal logs, said journal log table is referred to obtain information indicating a location where a journal log including said write I/O command and said write data are to be stored and a sequence number for use in identifying said journal log, and said journal log and sequence number are stored in said location indicated by said information.

19. A storage system according to claim 18, wherein when said journal function management table is used to manage a process of recovery of said primary volume to a certain point in time image based on the journal logs, said journal log table is referred to sequentially apply the journal logs to the old data according to sequence numbers stored with the journal logs with the result being stored in the primary volume, thereby recovering the primary volume to a certain point in time image.

20. A storage system according to claim 15, wherein the recovery of data on the primary volume is performed by applying the journal logs to the old data and storing the result in the primary volume.

21. A storage system according to claim 20, wherein said recovery of the primary volume while maintaining the primary volume and the remote secondary volume in the synchronous mode is conducted by sending the result of applying the journal logs to the old data to the second storage system and storing the result in the remote secondary volume.

22. A storage system according to claim 15, wherein each of said first and second storage systems comprises:

a storage device having a plurality of disk drives each for storing data; and a storage controller for controlling said storage device, wherein said storage controller comprises:

a front end controller for interfacing with a channel of an external device, at least one back end controller for interfacing with said storage devices, a shared memory for temporarily storing data including control data transferred between said external device and said storage device, and an interconnection apparatus for interconnecting said front end controller, said at least one back end controller and said shared memory.

23. A storage system according to claim 22, wherein said primary volume of said first storage system is a logical volume supported by said disk drives included in said storage device, and wherein said local secondary volume of said first storage system is a logical volume supported by said disk drives included in said storage device.

24. A storage system comprising:

a first storage apparatus which is connected to a host and which includes a primary volume able to store write data from the host, said primary volume being a logical volume, said first storage apparatus further including a local secondary volume which is a logical volume separate from said primary volume; and a second storage apparatus which is connected to said first storage apparatus via a path and which includes a remote secondary volume, wherein the remote secondary volume is a copied volume of the primary volumes, wherein the primary volume and the remote secondary volume are in synchronous mode, wherein the local secondary volume has stored therein journal logs of write input/output (I/O) commands issued by the host to the primary volume to store the write data in the primary volume and a base volume including an image of the primary volume at a certain point in time, wherein the remote secondary volume has stored therein journal logs of write input/output (I/O) commands issued by the host to the primary volume and sent to said second storage system to store write data in the remote secondary volume, a base volume including a copied image of the primary volume, and a replica base volume including a copy of the base volume, wherein recovery of data on the primary volume from the local secondary volume is conducted by performing recovery of data of the primary volume based on the base volume in the local secondary volume and the journal logs included in the local secondary volumes, wherein the recovery of the data on the primary volume from the local secondary volume is performed while maintaining the primary volume and the remote secondary volume in the synchronous mode, and wherein the recovery of data on the remote secondary volume is performed by applying the journal logs on the remote secondary volume to the replica base volume on the remote secondary volume, and storing the result in the base volume of the remote secondary volume while maintaining the primary volume and the remote secondary volume in the synchronous mode.

25. A storage system according to claim 24, wherein the recovery of data on the primary volume is performed by applying the journal logs to the base volume and storing the result in the primary volume.

26. A storage system according to claim 25, wherein storing the result of applying the journal logs to the base volume in the primary volume includes swapping the base volume for the primary volume.

27. A storage system according to claim 24, wherein storing the result of applying the journal logs to the replica base volume in the base volume of the remote secondary volume includes swapping the replica base volume for the base volume.

* * * * *